(12) United States Patent
Zhang

(10) Patent No.: US 12,495,245 B2
(45) Date of Patent: Dec. 9, 2025

(54) SOUND PRODUCING MODULE, SOUND ELIMINATING METHOD THEREFOR, AND SMART GLASSES

(71) Applicant: GOERTEK INC., Shandong (CN)

(72) Inventor: Jian Zhang, Shandong (CN)

(73) Assignee: Goertek Inc., Weifang (CN)

( * ) Notice: Subject to any disclaimer, the term of this patent is extended or adjusted under 35 U.S.C. 154(b) by 156 days.

(21) Appl. No.: 18/291,371

(22) PCT Filed: Dec. 16, 2021

(86) PCT No.: PCT/CN2021/138592
§ 371 (c)(1),
(2) Date: Jan. 23, 2024

(87) PCT Pub. No.: WO2023/000597
PCT Pub. Date: Jan. 26, 2023

(65) Prior Publication Data
US 2025/0119684 A1 Apr. 10, 2025

(30) Foreign Application Priority Data
Jul. 23, 2021 (CN) .......................... 202110837498.7

(51) Int. Cl.
*H04R 1/32* (2006.01)
*G02C 11/00* (2006.01)
*H04R 1/02* (2006.01)

(52) U.S. Cl.
CPC ............. *H04R 1/323* (2013.01); *G02C 11/10* (2013.01); *H04R 1/028* (2013.01)

(58) Field of Classification Search
CPC ......... H04R 1/323; H04R 1/028; G02C 11/10
USPC ........................................................... 381/77
See application file for complete search history.

(56) References Cited

U.S. PATENT DOCUMENTS

| 2010/0232630 | A1 | 9/2010 | Lee et al. |
| 2020/0112783 | A1* | 4/2020 | Wakeland ............. H04R 1/347 |
| 2020/0304905 | A1 | 9/2020 | Oishi et al. |

FOREIGN PATENT DOCUMENTS

| CN | 110830867 B | 9/2021 |
| CN | 113504663 B | 4/2023 |

* cited by examiner

*Primary Examiner* — Sean H Nguyen
(74) *Attorney, Agent, or Firm* — Baker Botts LLP

(57) ABSTRACT

Disclosed include a sound producing module, a sound eliminating method therefor, and smart glasses, wherein the sound producing module includes a housing and a sound producing unit. The housing includes a moving plate and a housing body having an accommodating cavity, the housing body is provided with a sound outlet opened thereon, and the moving plate is provided with a sound relief hole opened thereon. The sound producing unit is provided within the accommodating cavity, and separates the accommodating cavity into a front cavity in communication with the sound outlet and a rear cavity in communication with the sound relief hole. The moving plate is adapted to move relative to the housing body to change the position of the sound relief hole relative to the sound outlet.

10 Claims, 4 Drawing Sheets

SOUND PRODUCING MODULE, SOUND ELIMINATING METHOD THEREFOR, AND SMART GLASSES

CROSS-REFERENCE TO RELATED APPLICATIONS

The application is a National Stage of International Application No. PCT/CN2021/138592, filed on Dec. 16, 2021, which claims priority to Chinese patent application No. 202110837498.7, filed with the Chinese Patent Office on Jul. 23, 2021, and entitled "SOUND PRODUCING MODULE, SOUND ELIMINATING METHOD THEREFOR, AND SMART GLASSES", both of which are hereby incorporated by reference in their entireties.

TECHNICAL FIELD

The present application relates to the field of smart wearable technology, and in particular relates to a sound producing module, a sound eliminating method therefor, and smart glasses.

BACKGROUND

With the rapid development of the consumer electronics industry, there is also a strong demand for various smart wearable terminals, such as smart glasses, which have a lot of entertainment functions in addition to the functions of traditional glasses. For example, smart glasses can be provided with built-in Bluetooth system to realize the function of a Bluetooth headset, which can be connected with a cell phone to enable the smart glasses to answer phone calls or play music stored in the cell phone. At present, the sound producing module in smart glasses generally has an unvaried structure and cannot adaptively make optimal adjustment on sound eliminating directivity to surrounding target crowds, which may cause privacy risks.

SUMMARY

The present application mainly aims to provide a sound producing module, a sound eliminating method for the sound producing module, and smart glasses, aiming at solving the technical problem that the sound producing module in the existing smart glasses is unable to make adjustment to the sound eliminating directivity, which may cause privacy risks.

In order to achieve the above purpose, the present application provides a sound producing module, comprising:
  a housing comprising a moving plate and a housing body having an accommodating cavity, the housing body is provided with a sound outlet opened thereon, and the moving plate is provided with a sound relief hole opened thereon; and
  a sound producing unit provided within the accommodating cavity and separating the accommodating cavity into a front cavity in communication with the sound outlet and a rear cavity in communication with the sound relief hole, wherein the moving plate is capable of moving relative to the housing body to change the position of the sound relief hole relative to the sound outlet.

Optionally, the housing body is provided with a communicating hole opened thereon corresponding to the sound relief hole. The rear cavity, the sound relief hole and the connecting aperture are in sequential communication, and a orthographic projection of the sound relief hole on the housing body is located within the communicating hole.

Optionally, the communicating hole extends in the same direction as the sound relief hole does, with an extending width of the communicating hole greater than that of the sound relief hole. The moving plate is capable of moving relative to the housing body in an extending direction of the communicating hole.

Optionally, the housing body includes a first side wall and a second side wall provided opposite to each other. The sound producing unit and the first side wall forming the front cavity therebetween, the sound producing unit and the second side wall forming the rear cavity therebetween, the sound outlet being opened on the first side wall, the communicating hole being opened on the second side wall, and the moving plate being capable of moving relative to the second side wall.

Optionally, one side of the moving plate away from the sounding unit is in contact with the second side wall in a slidable manner.

Optionally, the moving direction of the moving plate is parallel to a long side of the sound producing unit.

Optionally, the sound producing module further includes a gear and a knob provided in the rear cavity, the moving plate being provided with a rack engaging with the gear, one end of the knob being connected to the gear, and the other end of the knob extending out of an outer side of the housing body.

Optionally, the moving plate is a flexible plate.

In addition, the present application provides a sound eliminating method for a sound producing module, comprising the following steps:
  acquiring positions of crowds around the sound producing module;
  determining a direction to a position of a crowd closest to the sound producing module as an optimal sound eliminating angle, and sending a moving instruction according to the optimal sound eliminating angle; and
  controlling the moving plate to move to a predetermined position according to the moving instruction so as to lead a sound eliminating area towards the closest crowd.

Further, the present application provides smart eyeglasses, the smart eyeglasses comprising a frame, temple arms, and the sound producing module as described above, the temple arms are connected to the frame, and the sound producing module is provided within the temple arms.

In the technical solution of the present application, the sound producing module includes a housing and a sound producing unit. The housing includes a moving plate and a housing body having an accommodating cavity, the sound producing unit is provided in the accommodating cavity. The sound producing unit separates the accommodating cavity into a front cavity and a rear cavity. The housing body is provided with a sound outlet opened thereon in communication with the front cavity, and the moving plate is provided with a sound relief hole opened thereon in communication with the rear cavity. Since the moving plate is capable of moving relative to the housing body, the position of the sound relief hole relative to the sound outlet is not fixed, instead, it can be changed with the movement of the moving plate. According to the principle of wave interference, it can be known that the sound eliminating directivity of the sound producing module may be changed. Through the mobile sound relief hole, after determining the relative positions of the crowds, the sound eliminating directivity can be adjusted adaptively to maximize protection of the privacy of the consumer.

BRIEF DESCRIPTION OF THE DRAWINGS

In order to more clearly illustrate technical solutions in the embodiments of the present invention or the prior art, the following will briefly introduce the drawings that need to be used in the description of the embodiments or the prior art. Obviously, the accompanying drawings in the following description are only some embodiments of the present invention. For those skilled in the art, other drawings can also be obtained according to the structures shown in these drawings without creative effort.

EXPLANATION OF REFERENCE NUMBERS

| reference number | name | reference number | name |
|---|---|---|---|
| 10 | smart glasses | 11 | temple arm |
| 12 | frame | 20 | sound producing module |
| 30 | housing | 31 | housing body |
| 32 | moving plate | 321 | sound relief hole |
| 311 | sound outlet | 40 | sound producing unit |
| 21 | accommodating cavity | 211 | front cavity |
| 212 | rear cavity | 312 | first side wall |
| 313 | second side wall | 314 | third side wall |
| 315 | fourth side wall | 41 | long side |
| 22 | gear | 322 | rack |
| 23 | knob | 50 | sound eliminating area |
| 316 | communicating hole | | |

The implement of the purpose, functional characteristics and advantages of the present invention will be further described in conjunction with the embodiments and with reference to the accompanying drawings.

DETAILED DESCRIPTION

The following will clearly and completely describe the technical solutions in the embodiments of the present invention with reference to the accompanying drawings in the embodiments of the present invention. Obviously, the described embodiments are only a part of the embodiments of the present invention, not all of them. Based on the embodiments of the present invention, all other embodiments obtained by persons of ordinary skill in the art without creative efforts fall within the protective scope of the present invention.

It should be noted that if there are directional indications (such as up, down, left, right, front, back . . . ) in the embodiment of the present invention, the directional indications are only used to explain the relative position relationship, motion situation, etc. between various components in a specific posture (as shown in the accompanying drawings). If the specific posture changes, the directional indication will also change accordingly.

In addition, if there are descriptions involving "first", "second" and so on in the embodiments of the present invention, the descriptions of "first", "second" and so on are only for descriptive purposes, and should not be interpreted as indicating or implying its relative importance or implicitly indicates the number of technical features indicated. Thus, the features defined as "first" and "second" may explicitly or implicitly include at least one of these features. In addition, the technical solutions of the various embodiments can be combined with each other, but it must be based on that can be realized by those skilled in the art. When the combination of technical solutions is contradictory or cannot be realized, it should be considered that the combination of technical solutions does not exist, nor within the protective scope of the present invention.

Figure 2:
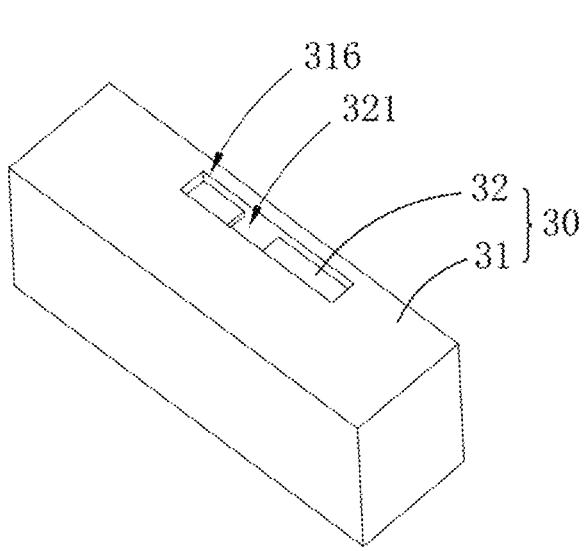
FIG. 2 shows a schematic illustration of a sound producing module according to an embodiment of the present application.
Figure 3:
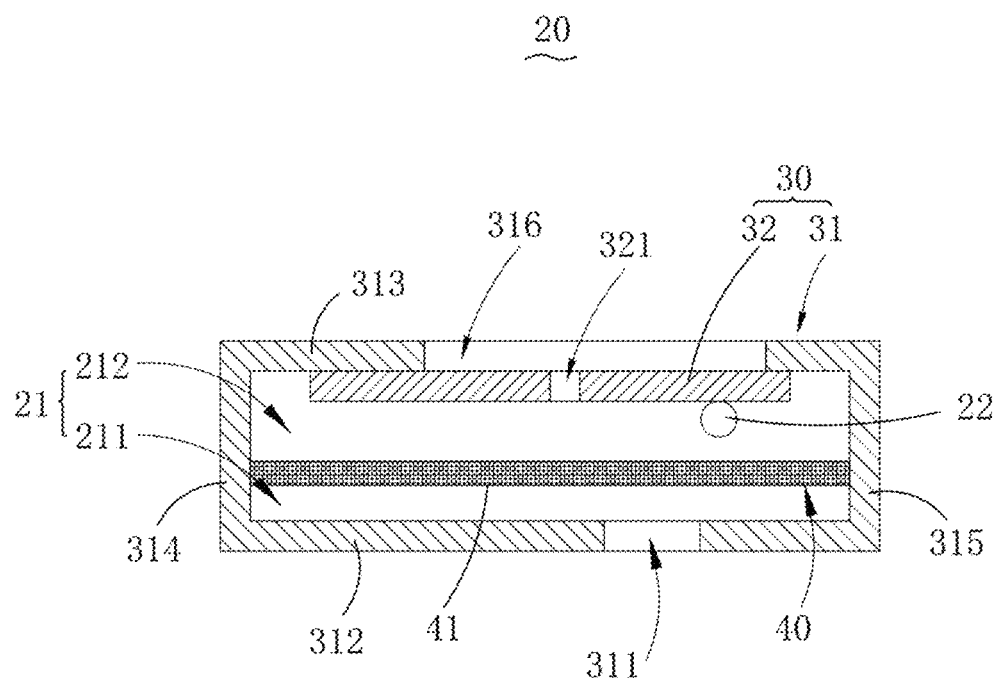
FIG. 3 shows a schematic illustration of another view of the sound producing module according to an embodiment of the present application.

The present application proposes a sound producing module 20. As shown in FIGS. 2 and 3, the sound producing module 20 includes a housing 30 and a sound producing unit 40. The housing 30 includes a moving plate 32 and a housing body 31 having an accommodating cavity 21. The housing body 31 is provided with a sound outlet 311 opened thereon, and the moving plate 32 is provided with a sound relief hole 321 opened thereon. The sound producing unit 40 is provided within the accommodating cavity 21, and separating the accommodating cavity 21 into a front cavity 211 in communication with the sound outlet 311 and a rear cavity 212 in communication with the sound relief hole 321. The moving plate 32 can move relative to the housing body 31 to change a position of the sound relief hole relative to the sound outlet 311.

Based on the formula derived in Fundamentals of Acoustics for the superposition of a dipole-radiated sound field on the sound pressure radiated in space by two small spherical sources of equal amplitudes and opposite phases:

$$p = \frac{A}{r_+} e^{j(\omega t - kr_+)} - \frac{A}{r_-} e^{j(\omega t - kr_-)} \qquad \text{Formula 1}$$

where A is a constant to be determined (complex number), and the absolute value of $$\frac{A}{r}$$

is an amplitude of the sound pressure. In a sound field far from a sound source, assuming, $r \gg \lambda$, when sound waves radiated by two small spherical sources arrive at an observation point p, the difference in amplitude is very small, the amplitude parts r+ and r− in Formula 1 are approximately replaced by r, and the following approximate relationship can be obtained from the above Formula 1:

$$r_+ \approx r + \frac{\iota}{2} \cos\theta \qquad \text{Formula 2}$$

$$r_- \approx r - \frac{\iota}{2} \cos\theta$$

It can be obtained by substituting the phase part in Formula 1 by Formula 2:

$$p \approx \frac{A}{r} e^{j(\omega t - kr)} \left( e^{j\frac{k\iota \cos\theta}{2}} - e^{-j\frac{k\iota \cos\theta}{2}} \right) = \qquad \text{Formula 3}$$

$$\frac{A}{r} e^{j(\omega t - kr)} \left( -2j \sin\frac{k\iota \cos\theta}{2} \right)$$

When the two small spherical sources are very close to each other and the frequency is not very high, it can be considered that k\iota<1, and then Formula 3 can be simplified as:

$$p \approx -j \frac{kA\iota}{r} \cos\theta \, e^{j(\omega t - kr)} \qquad \text{Formula 4}$$

It can be seen from Formula 4, the sound pressure of the dipole radiation sound field far away from the sound source decreases inversely proportional to the distance. The difference from the radiation sound field of the pulsating sphere source is that, the dipole radiation is related to an angle θ. That is to say, at the same distance in the sound field, the sound pressure varies in positions of different directions. In the directions of θ=±90°, the sound waves from the two small spherical sources just have the same amplitudes and opposite phases, so as to be canceled out, and the synthesized sound pressure is zero. In the directions of θ=0°, 180°, the sound waves from the two small spherical sources have approximately equal amplitudes and phases, so as to overlap and strengthen, and the synthesized sound pressure is at the maximum. In order to describe the characteristic that radiation of a sound source varies with directions, the ratio of the amplitude of the sound pressure in any θ direction to the amplitude of the sound pressure at the axis of θ=0° is defined as the radiation directivity of the sound source, i.e.:

$$D(\theta) = \frac{(p_a)_\theta}{(p_a)_{\theta=0}} \qquad \text{Formula 5}$$

For dipole sound sources, the directivity is given by Formula 5:

$$D(\theta) = |\cos\theta| \qquad \text{Formula 6}$$

Figure 5:
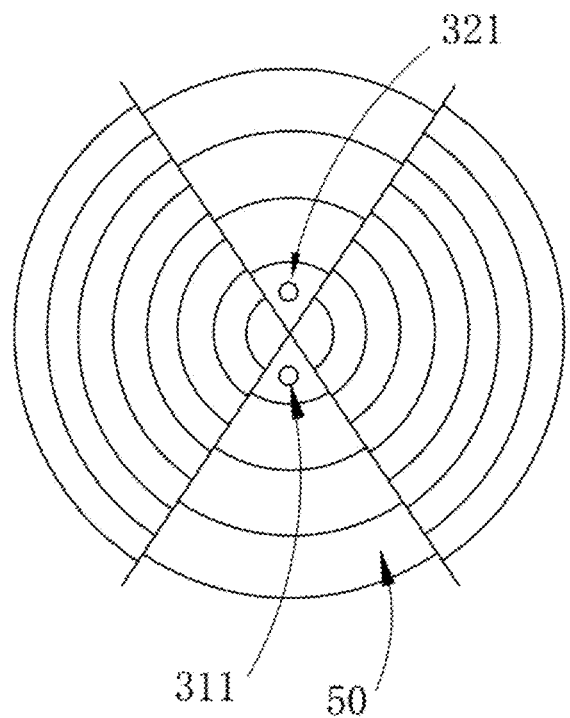
FIG. 5 shows a schematic illustration of sound eliminating directivity of a sound producing module according to an embodiment of the present application.
Figure 6:
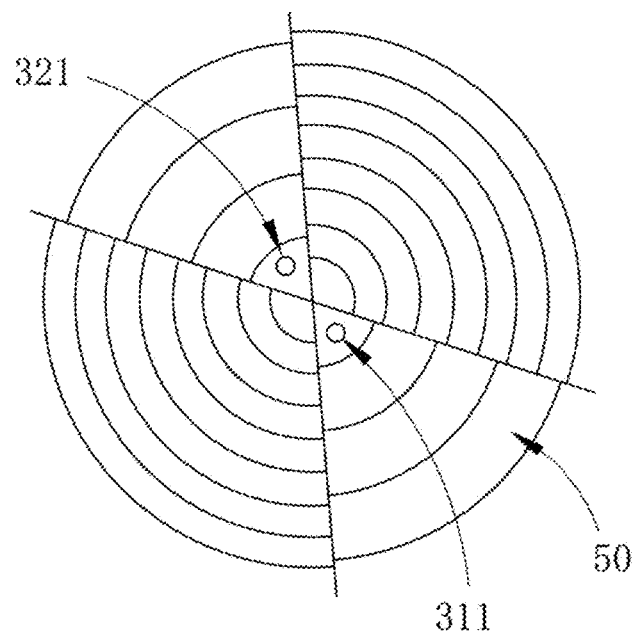
FIG. 6 shows a schematic illustration of sound eliminating directivity of a sound producing module according to another embodiment of the present application.
Figure 7:
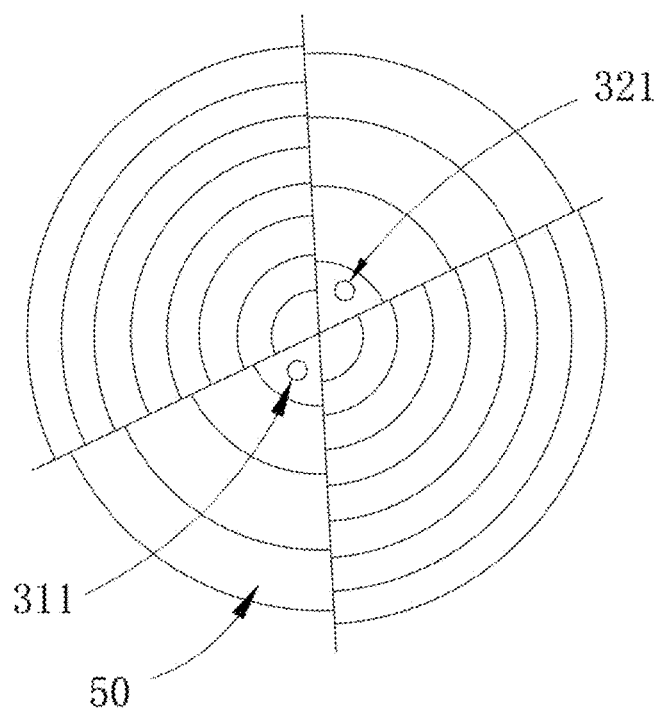
FIG. 7 shows a schematic illustration of sound eliminating directivity of a sound producing module according to yet another embodiment of the present application.

Based on the principle of dipole sound wave interference described above, it is known that the sound eliminating direction of the dipole is related to the relative positions of the two-point sound sources, i.e., the angle θ affects the directivity of eliminating the sound. The sound producing unit 40 of the present application may include a vibration system and a magnetic circuit system with a magnetic gap. The vibration system includes a diaphragm and a voice coil supporting the vibration of the diaphragm, and the voice coil is electrically connected to an external circuit. When the voice coil is energized, the voice coil vibrates under the influence of the magnetic field generated by the magnetic circuit system, thereby driving the diaphragm to vibrate and produce sound. A front cavity 211 is formed between the diaphragm and the housing body 31, and the sound produced by the vibration of the diaphragm is transmitted from the sound outlet 311 through the front cavity 211. In order to ensure that the airflow in the sound producing unit 40 is smooth when the diaphragm vibrates, a sound relief hole 321 is provided on a moving plate 32 of the housing 30. The airflow can flow out of the sound producing module 20 from the sound relief hole 321 through the rear cavity 212, which improves the acoustic performance of the sound producing module 20. Since the moving plate 32 can move relative to the housing body 31, i.e., the sound relief hole 321 is movable while the position of the sound outlet 311 is fixed, and therefore the relative position between the sound relief hole 321 and the sound outlet 311 may vary. FIGS. 5 to 7 show the changes in the directivity of eliminating sound in the case of different relative positions between the sound relief hole 321 and the sound outlet 311, and the sound eliminating area 50 will vary with relative position between the sound relief hole 321 and the sound outlet 311.

It should be noted that the sound producing module 20 is particularly suitable as the sound producing module 20 of the smart glasses 10, but is not limited to the sound producing module 20 of the smart glasses 10. If the sound producing module 20 provided in the present application is applied to other wearable devices, they should also fall into the scope of the present application. Among them, the smart glasses 10 may be glasses with a microphone and the above-described sound producing module 20 mounted on the temple arms 11, and may also be VR glasses or AR glasses. The smart glasses 10 may obtain orientation of the surrounding crowds through the processing of the far-field sound pickup algorithm, or determine the orientation of the surrounding crowds by installing a camera module, a laser sensor, or the like, and set the direction to the crowd closest to the user as an optimal sound eliminating angle. Then an instruction regarding optimal sound eliminating angle is provided to the sound producing module, and the moving plate 32 moves to the optimal position according to the attenuation direction of sound eliminating, thus achieving adaptive far-field sound eliminating. The privacy of the smart glasses 10 is optimized, and the privacy of the consumer is protected.

Specifically, the housing body 31 is provided with a communicating hole 316 opened thereon corresponding to the sound relief hole 321, wherein the rear cavity 212, the sound relief hole 321 and the communicating hole 316 are in sequential communication, and a orthographic projection of the sound relief hole 321 on the housing body 31 is located within the communicating hole 316. When the diaphragm vibrates, the airflow generated within the sound producing unit 40 can be discharged through the rear cavity 212, the sound relief hole 321, and the communicating hole 316. The size of the communicating hole 316 is larger than that of the sound relief hole 321 so as to adapt to the moving range of the sound relief hole 321. When the sound relief hole 321 is moving, the housing body 31 will not obscure the sound relief hole 321, and the relative position of two-point sound sources can vary through the movement of the sound relief hole 321, and the sound eliminating area 50 also varies accordingly. The moving plate 32 is accommodated in the rear cavity 212 and does not influence the appearance of the sound producing module 20. In other embodiments, the moving plate 32 can also be provided outside of the housing body 31, that is, the rear cavity 212, the communicating hole 316 and the sound relief hole 321 are in sequential communication. An opening may also be provided on one side of the housing body 31, and the moving plate 32 directly covers the opening, as long as it is possible to realize that the relative position of the sound relief hole 321 and the sound outlet 311 can vary.

More specifically, extension directions of the communicating hole 316 and the sound relief hole 321 are the same, and the extension width of the communicating hole 316 is larger than the extension width of the sound relief hole 321. The moving plate 32 can move along the extension direction of the communicating hole 316 relative to the housing body 31. For example, the communicating hole 316 is an elongated through-hole, and the width of the sound relief hole 321 is smaller than that of the communicating hole 316. The moving plate 32 moves along the extension direction of the communicating hole 316 to increase the moving range of the sound relief hole 321, and the communicating hole 316 does not need to occupy a large space. The communicating hole 316 can be set according to the moving needs of the moving plate 32, and will not influence the overall appearance of the sound producing module 20 and can increase the structural firmness of the housing 30.

Optionally, the housing body 31 includes a first side wall 312 and a second side wall 313 opposite to each other, wherein the front cavity 211 is formed between the sound producing unit 40 and the first side wall 312, the rear cavity 212 is formed between the sound producing unit 40 and the second side wall 313, the sound outlet 311 is opened on the first side wall 312, the communicating hole 316 is opened on the second side wall 313, and the moving plate 32 is capable of moving relative to the second side wall 313, i.e., the sound outlet 311 and the movable sound relief hole 321 are provided opposite to each other, which facilitates directing of the sound eliminating region 50 to the surrounding crowd, and is beneficial for protection of privacy. The housing body 31 also includes a third side wall 314 and a fourth side wall 315 opposite to each other. The first side wall 312, the third side wall 314, the second side wall 313, and the fourth side wall 315 are connected in sequence. Both ends of the sound producing unit 40 are connected to the third side wall 314 and the fourth side wall 315, respectively. Wherein the first side wall 312 and the second side wall 313 may be directly used as outer wall surfaces of the temple arms 11 of the smart glasses 10. For example, the sound outlet 311 is provided in the outer side of the temple arms 11, i.e., the side facing an ear of the user. The sound relief hole 321 and the communicating hole 316 are provided in the inner side of the temple arms 11, i.e., the side facing the head of the user.

In more detail, one side of the moving plate 32 away from the sound producing unit 40 is in contact with the second side wall 313 in a sliding manner. The moving plate 32 is located in the interior of the housing body 31 and is in direct contact with the second side wall 313, which saves space and reduces the height of the sound producing module 20. The movement of the moving plate 32 may be realized by a driving mechanism, for example, the driving mechanism is a micro motor, and the motor is connected to the moving plate 32. The motor receives the instruction of an optimal sound eliminating angle sent by a control system, and then drives the moving plate 32 to move so that the sound relief hole 321 moves to a corresponding position to meet the optimal sound eliminating angle. A sliding connection may also be realized by providing a sliding rail or sliding groove on one side of the moving plate 32 away from the sound producing unit 40, and providing a corresponding sliding rail or sliding groove on the second side wall 313. In other embodiments, the moving plate 32 may also be in contact with one side of the second side wall 313 away from the sound producing unit 40 in a sliding manner to realize movement of the sound relief hole 321.

As a preferred embodiment, the moving direction of the moving plate 32 is parallel to a long side 41 of the sound producing unit 40, which can enlarge the moving range of the sound relief hole 321 for providing directional sound eliminating of the surrounding crowd at different angles. The first side wall 312 and the second side wall 313 are parallel to the long side 41 of the sound producing unit 40, respectively. The extension direction of the long side 41 of the sound producing module 20 is the same as that of the temple arms 11 of the smart glasses 10, and the thickness of the temple arms 11 can reduce. Among other things, the first side wall 312 and the second side wall 313 may be directly used as part of the outer wall surface of the temple arms 11, which may fully utilize the space of the temple arms 11, and does not influence the overall appearance of the temple arms 11, so that the appearance remains consistent.

The moving plate 32 of the embodiment is preferably a flexible plate, for example a rubber or plate-like structure that can undergo deformation, such as a relatively thin steel sheet, an aluminum sheet. After the two ends of the moving plate 32 come into contact with the housing body 31 of the sound producing module 20, the moving plate 32 may be curled to generate deformation. But the housing body 31 does not influence the movement of the moving plate 32, and the position of the sound relief hole 321 with respect to the sound outlet 311 can still be changed. On the premise of ensuring that the moving range of the sound eliminating area 50 is sufficiently large, the size of the sound producing module 20 can be reduced without occupying the space of the temple arms 11.

Figure 4:
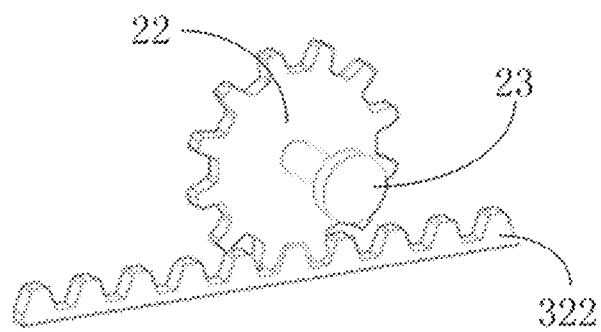
FIG. 4 shows a schematic illustration of the cooperation of the gear and rack of the sound producing module according to an embodiment of the present application.

In an embodiment, as shown in FIGS. 3 and 4, the sound producing module 20 further includes a gear 22 located in the rear cavity 212, and the moving plate 32 is provided with a rack 322 engaging with the gear 22 with each other. The gear 22 may be connected to a driving mechanism (e.g., a micro motor). The cooperation between the gear 22 and the rack 322 enables the moving range of the moving plate 32 to be more precise and divides the movement of the moving plate 32 into multiple tap positions. By correlating sound eliminating angles to different tap positions, a more precise adjustment of the sound eliminating directivity is realized.

Optionally, the sound producing module 20 also includes a knob 23, one end of the knob 23 is connected to the gear 22, and the other end of the knob 23 extends out of an outer side of the housing body 31, so that a user can manually adjust the movement of the moving plate 32 according to needs. The embodiment can not only automatically adjust the angle of the sound eliminating area 50, but also realize manual adjustment in a variety of forms, which can satisfy the different needs of the user.

In addition, the present application provides a sound eliminating method for a sound producing module 20, comprising the following steps:

acquiring positions of crowds around the sound producing module 20;

determining a direction to a position of a crowd closest to the sound producing module 20 as an optimal sound eliminating angle, and sending a moving instruction according to the optimal sound eliminating angle; and controlling the moving plate 32 to move to a predetermined position accordance to the moving instruction so as to lead the sound eliminating area towards the closest crowd.

The present application can obtain the orientation of the surrounding crowd through the processing of the far-field sound pickup algorithm, or determine the orientation of the surrounding crowd by installing a camera module, laser sensor, or the like, and then determine the direction to the nearest crowd as the optimal sound eliminating angle. Then a moving instruction is sent to the moving plate 32, and a preset table corresponding to the sound eliminating angle and the moving position of the moving plate can be stored in the sound producing module. The moving plate 32 is controlled to move to a preset position corresponding to the optimal sound eliminating angle, so that the relative position of the sound relief hole 321 and the sound outlet 311 enables the sound eliminating area toward the nearest crowds around the sound producing module 20, so as to achieve adaptive far-field sound eliminating, optimizing privacy protection of the smart glasses 10, and protecting the privacy of the consumer.

Figure 1:
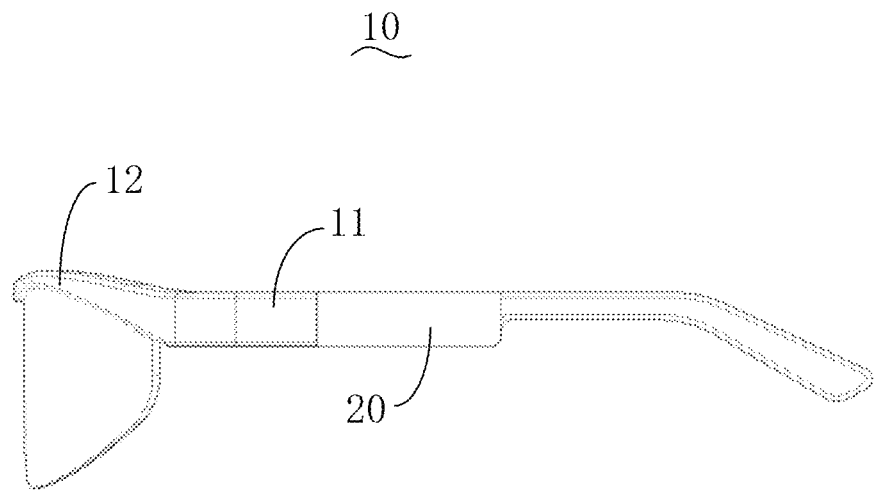
FIG. 1 shows a schematic illustration of smart glasses according to an embodiment of the present application.

In addition, the present application also provides smart glasses 10, as shown in FIG. 1. The smart glasses 10 include a frame 12, temple arms 11, and a sound producing module 20 as described above. The temple arms 11 are connected to the frame 12, and the sound producing module 20 is provided within the temple arms 11. The specific structure of the sound producing module 20 refers to the above embodiments. Since the smart glasses 10 uses all the technical solutions of all the above embodiments, it has at least all the beneficial effects brought about by the technical solutions of the above embodiments, which will not be repeated herein.

The above are only preferred embodiments of the present invention, and are not intended to limit the scope of the present invention. Under the inventive concept of the present invention, the equivalent structural transformation made by using the contents of the description and the accompanying drawings of the present invention, or directly/indirectly used in other all relevant technical fields is included in the protective scope of the present invention.

The invention claimed is:

1. A sound producing module, comprising:
    a housing comprising a moving plate and a housing body having an accommodating cavity, wherein the housing body is provided with a sound outlet opened thereon, and the moving plate is provided with a sound relief hole opened thereon; and
    a sound producing unit provided within the accommodating cavity and separating the accommodating cavity into a front cavity in communication with the sound outlet and a rear cavity in communication with the sound relief hole,
    wherein the moving plate is adapted to move relative to the housing body to change a position of the sound relief hole relative to the sound outlet.

2. The sound producing module according to claim 1, wherein the housing body is provided with a communicating hole opened thereon corresponding to the sound relief hole, wherein the rear cavity, the sound relief hole, and the communicating hole are in a sequential communication, and an orthographic projection of the sound relief hole on the housing body is located within the communicating hole.

3. The sound producing module according to claim 2, wherein
    the communicating hole extends in the same direction as the sound relief hole does, with an extending width of the communicating hole greater than that of the sound relief hole, and
    the moving plate is adapted to move relative to the housing body in an extending direction of the communicating hole.

4. The sound producing module according to claim 2, wherein the housing body comprises a first side wall and a second side wall provided opposite to each other, the sound producing unit and the first side wall forming the front cavity therebetween, the sound producing unit and the second side wall forming the rear cavity therebetween, the sound outlet being opened on the first side wall, the communicating hole being opened on the second side wall, and the moving plate adapted to move relative to the second side wall.

5. The sound producing module according to claim 4, wherein a side of the moving plate distal to the sound producing unit is in contact with the second side wall in a slidable manner.

6. The sound producing module according to claim 4, wherein a moving direction of the moving plate is parallel to a long side of the sound producing unit.

7. The sound producing module according to claim 1, wherein the sound producing module further comprises a gear and a knob provided in the rear cavity, the moving plate being provided with a rack engaging with the gear, a first end of the knob connected to the gear, and a second end of the knob extending out of an outer side of the housing body.

8. The sound producing module according to claim 1, wherein the moving plate is a flexible plate.

9. A sound eliminating method for a sound producing module applied to the sound producing module according to claim 1, the sound eliminating method comprising:
    acquiring positions of two or more crowds around the sound producing module;
    determining a direction to a position of a closest crowd to the sound producing module as an optimal sound eliminating angle, and sending a moving instruction according to the optimal sound eliminating angle; and
    controlling the moving plate to move to a predetermined position according to the moving instruction to lead a sound eliminating area towards the closest crowd.

10. Smart glasses, comprising:
    a frame;
    temple arms; and
    a sound producing module according to claim 1; wherein the temple arms are connected to the frame, and the sound producing module is provided within the temple arms.

* * * * *